C. B. MATHEWS.
CHIPPER'S GUIDE MARKER.
APPLICATION FILED AUG. 14, 1919.
1,327,874.
Patented Jan. 13, 1920.
2 SHEETS—SHEET 1.
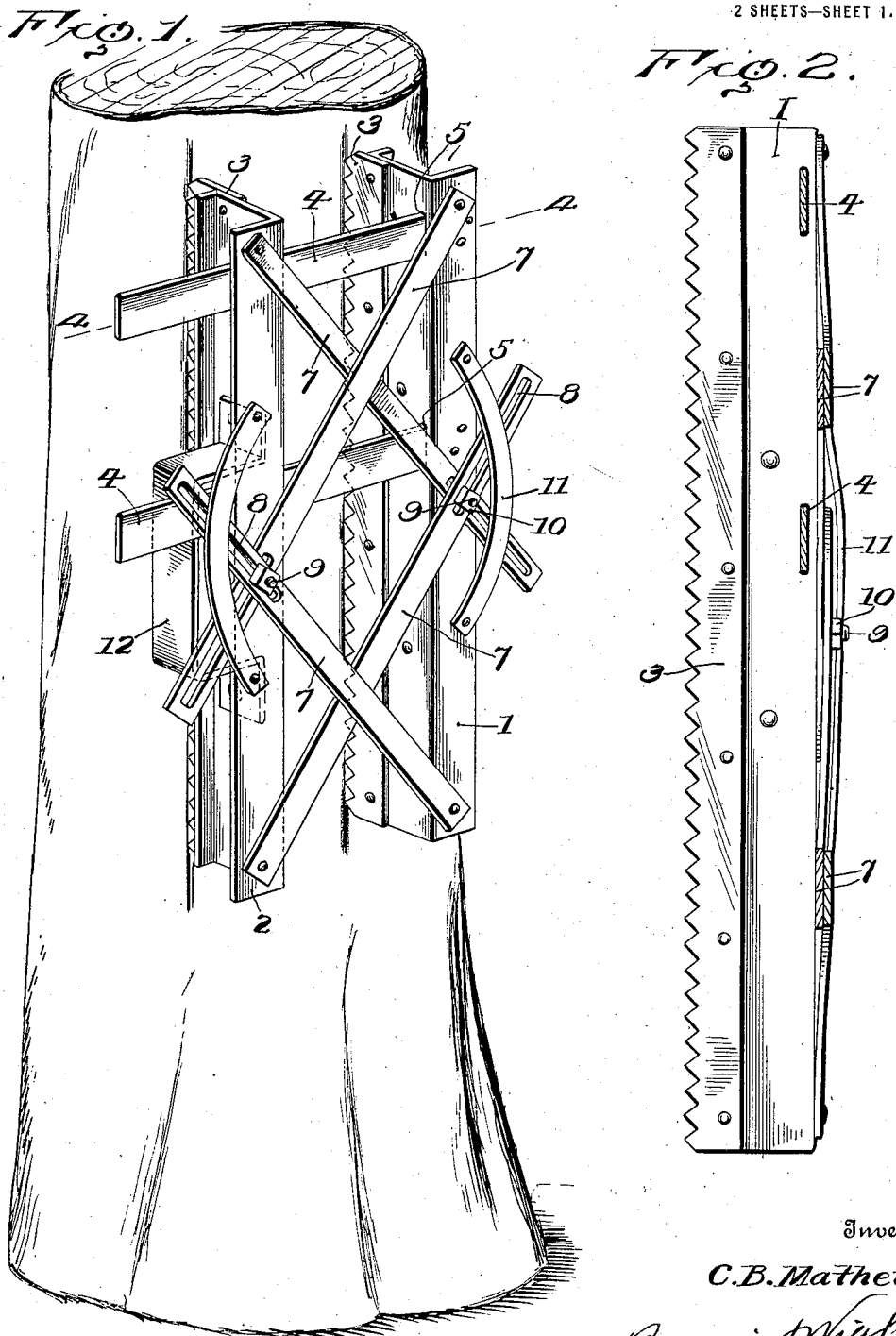

C. B. MATHEWS.
CHIPPER'S GUIDE MARKER.
APPLICATION FILED AUG. 14, 1919.
1,327,874.
Patented Jan. 13, 1920.
2 SHEETS—SHEET 2.
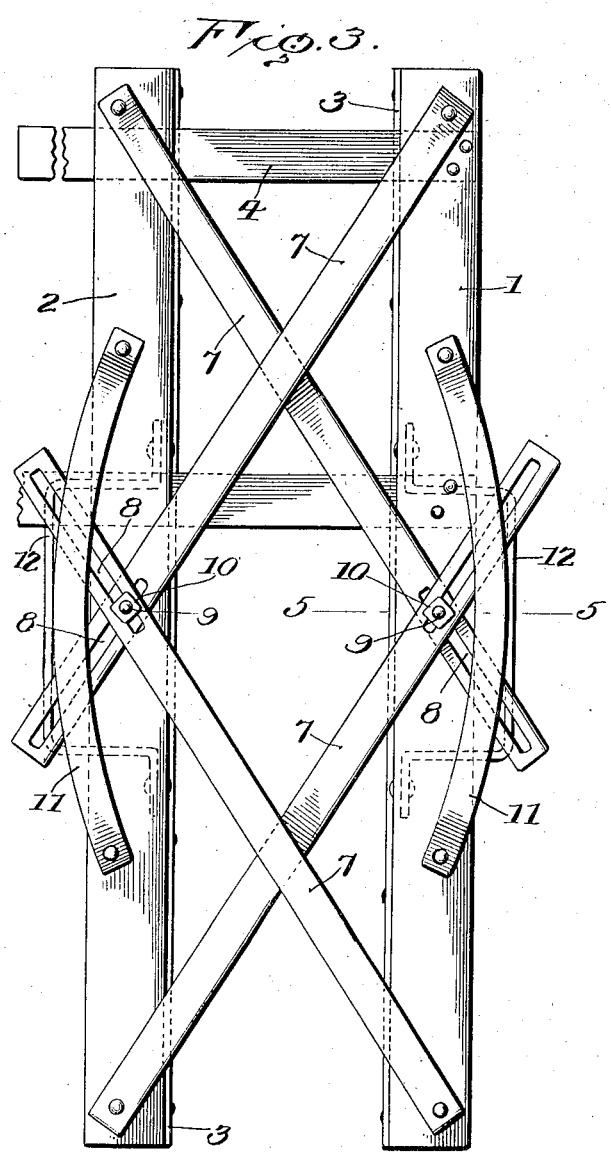
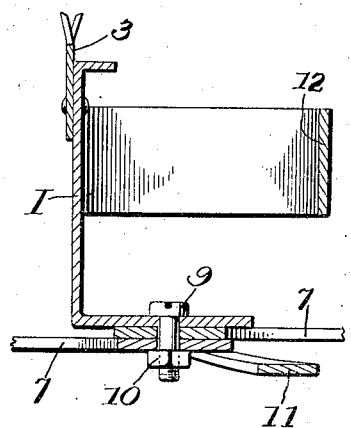
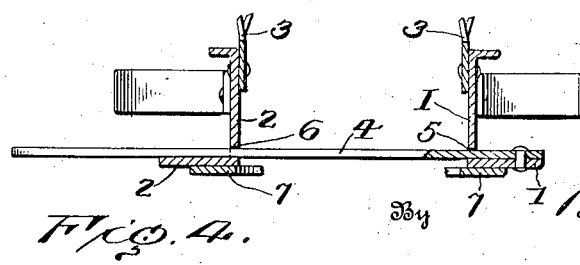
Inventor
C. B. Mathews
By Baldwin Wight
Attorney

UNITED STATES PATENT OFFICE.

CHARLEY B. MATHEWS, OF ANDALUSIA, ALABAMA.

CHIPPER'S GUIDE-MARKER.

1,327,874.                    Specification of Letters Patent.           Patented Jan. 13, 1920.

Application filed August 14, 1919. Serial No. 317,592.

*To all whom it may concern:*

Be it known that I, CHARLEY B. MATHEWS, a citizen of the United States, residing in Andalusia, in the county of Covington and State of Alabama, have invented certain new and useful Improvements in Chippers' Guide-Markers, of which the following is a specification.

My invention relates to improvements in chippers' guide markers and pertains particularly to means for marking guides for turpentine chippers.

It has been customary in the past, in gathering turpentine, to chip the trees in a haphazard manner without a definite limit to the width of the chipping. The location and size of the cut has been left to the discretion of the individual chipper. This practice has been very injurious to the trees, and it is the object of my invention to provide a device for making guide lines on the trees between which the chipping is done.

In carrying out my invention, I provide a frame carrying a pair of relatively adjustable saw blades, and handles for manipulating the device.

In the accompanying drawings:—

Figure 1 is a perspective view of my invention, showing the manner in which it is used.

Fig. 2 is a vertical section therethrough.

Fig. 3 is a top plan view of the marker, showing the adjusting elements.

Fig. 4 is a horizontal section on the line 4—4 of Fig. 1, showing the mounting of the saw blades in the frame and the lateral guides upon which the frame is adjusted, and Fig. 5 is a horizontal section on the line 5—5 of Fig. 3, showing a detail of the handle and adjusting elements.

The invention comprises longitudinal members 1 and 2, preferably angle irons, to the flat sides of which are fastened the saw blades 3, 3. To the longitudinal member 1 the lateral guides 4, 4 are affixed. These extend through suitable openings 5, 5 in the member 1 and are adapted to slide through similar openings 6, 6 in the member 2.

Links 7, 7 are pivoted at one end to the longitudinal members and have slots 8, 8 in their other ends as is shown in Figs. 1 and 3. The slots are provided for the purpose of adjustment and slide on a bolt 9 passing through the slots and through the center of the longitudinal members. A nut 10 is provided to lock the links in the desired position. A slightly bent arcuate strip of metal 11 is provided on each longitudinal member to bear against the outer ends of the links to hold them in their proper position. Handles 12, 12 are fastened to the longitudinal members in order that the device may be properly manipulated.

In operation, the chipper adjusts the frame so that the saws are in their desired parallel, spaced relation according to the size of the tree and places it vertically against the tree, pressing it into the bark. He then moves it up and down a few times, thereby making two incisions in the bark. The incisions thus formed are used as a guide by the chipper between which the chipping is to be done.

It is obvious that changes may be made in the construction without departing from the spirit of my invention, and I do not wish to be limited to the precise structure disclosed.

I claim as my invention:—

1. A guide marker, comprising longitudinal members having openings, scoring blades mounted on said longitudinal members, lateral guides secured to one longitudinal member and slidable on the other, said guides passing through said openings, and means permitting the adjustment of said longitudinal members with respect to each other.

2. A guide marker, comprising longitudinal members having openings, scoring blades mounted on said longitudinal members, lateral guides secured to one longitudinal member and slidable on the other, said guides passing through said openings, and means permitting the adjustment of said longitudinal members with respect to each other, said means comprising pivoted links having slots and a bolt passing through said slots.

In testimony whereof, I have hereunto subscribed my name.

CHARLEY B. MATHEWS.